(12) United States Patent
Wolgemuth et al.

(10) Patent No.: US 11,817,722 B2
(45) Date of Patent: Nov. 14, 2023

(54) OPPORTUNITY CHARGING OF QUEUED ELECTRIC VEHICLES

(71) Applicant: Momentum Dynamics Corporation, Malvern, PA (US)

(72) Inventors: John M. Wolgemuth, Chester Springs, PA (US); Anthony W. Calabro, Devon, PA (US)

(73) Assignee: InductEV Inc., King of Prussia, PA (US)

(*) Notice: Subject to any disclaimer, the term of this patent is extended or adjusted under 35 U.S.C. 154(b) by 112 days.

(21) Appl. No.: 17/199,234

(22) Filed: Mar. 11, 2021

(65) Prior Publication Data

US 2022/0294277 A1    Sep. 15, 2022

(51) Int. Cl.
*H02J 50/90* (2016.01)
*H02J 50/10* (2016.01)
(Continued)

(52) U.S. Cl.
CPC ............ *H02J 50/90* (2016.02); *B60L 53/126* (2019.02); *B60L 53/305* (2019.02); *B60L 53/32* (2019.02);
(Continued)

(58) Field of Classification Search
CPC .................................................... B60L 53/32
See application file for complete search history.

(56) References Cited

U.S. PATENT DOCUMENTS 6,792,259 B1 *  9/2004  Parise ................. H01M 10/443
                                                    455/343.1
9,931,952 B2    4/2018  Tripathi et al.
(Continued)

FOREIGN PATENT DOCUMENTS

| CN | 108407640 B | 7/2021 |
|----|---|---|
| JP | 2015528272 A | 9/2015 |

OTHER PUBLICATIONS

International Application No. PCT/US2022/070670, "International Search Report" dated Apr. 15, 2022, Patent Cooperation Treaty, 2 pages.

(Continued)

*Primary Examiner* — David V Henze-Gongola
(74) *Attorney, Agent, or Firm* — Culhane Meadows PLLC; Michael P. Dunnam

(57) ABSTRACT

A traffic queue having at least one charging lane including a plurality of ground-side wireless charging assemblies installed in the ground and spaced to permit at least two vehicles to be simultaneously charged by wireless power transfer is used to charge electric vehicles. During charging, the vehicle is aligned with a first ground-side wireless charging assembly in the at least one charging lane and charged using the first ground-side wireless charging assembly in a first charging session. The vehicle is then advanced to a second ground-side wireless charging assembly and aligned with the second ground-side wireless charging assembly and charged using the second ground-side wireless charging assembly in a second charging session. A time-ordered sequence of messaging is provided between the first and second ground-side wireless charging assemblies and a vehicle-side wireless charging assembly to control providing power and billing for the first and second charging sessions.

35 Claims, 5 Drawing Sheets

(51) Int. Cl.
  *B60L 53/126* (2019.01)
  *B60L 53/30* (2019.01)
  *B60L 53/36* (2019.01)
  *B60L 53/63* (2019.01)
  *B60L 53/66* (2019.01)

(52) U.S. Cl.
  CPC ............... *B60L 53/36* (2019.02); *B60L 53/63* (2019.02); *B60L 53/66* (2019.02); *H02J 50/10* (2016.02)

(56) References Cited

U.S. PATENT DOCUMENTS

| | | |
|---|---|---|
| 10,040,360 B1 | 8/2018 | Long et al. |
| 10,135,496 B2 | 11/2018 | Long et al. |
| 10,193,400 B2 | 1/2019 | Long et al. |
| 10,814,729 B2 | 10/2020 | Long et al. |
| 10,826,565 B2 | 11/2020 | Daga et al. |
| 2012/0203410 A1 | 8/2012 | Wechlin et al. |
| 2012/0268245 A1* | 10/2012 | Alexander ............. G06Q 20/18 340/5.82 |
| 2017/0136888 A1* | 5/2017 | Ricci ...................... B60M 7/003 |
| 2019/0217718 A1 | 7/2019 | Torres et al. |

OTHER PUBLICATIONS

Mültin, Marc, "Communication Protocols for Electric Vehicle Charging—Meet ISO 15118-20," Newcastle University Webinar, Nov. 26, 2019, V2G Clarity, 36 pages.

* cited by examiner

OPPORTUNITY CHARGING OF QUEUED ELECTRIC VEHICLES

TECHNICAL FIELD

This patent application describes the use of wireless power transfer and wireless communications to automatically charge electric vehicles in a queue while waiting for passenger or freight loading.

BACKGROUND

Wireless Power Transfer (WPT) uses magnetic induction in an air core transformer to inductively couple a primary (transmitter) and a secondary (receiver) displaced along a common axis. Electrical power is sent from the transmitting apparatus to the receiving apparatus by means of magnetic flux linkage between the primary (transmitting) and secondary (receiving) coils as stated in Faraday's Law of magnetic induction.

Wireless inductive communications may use inductively coupled loop antennas as described, for example, in U.S. Pat. Nos. 10,135,496 and 10,826,565, both entitled "Near field, full duplex data link for use in static and dynamic resonant induction wireless charging," the descriptions of which are incorporated herein by reference. Such a wireless inductive communications system enables the ground charging apparatus and the vehicle charging apparatus to exchange control signals and other communications during the charging process.

Traffic Queues, also known as traffic stands, are used for the loading and unloading of passengers and freight at high-traffic locations such as transport hubs (e.g., airports, rail stations, hotel driveways, railway stations, subway stations, bus depots, ferry terminals, etc.) and high-traffic destinations (e.g., hotels, shopping plazas, event centers, etc.). Such facilities are typically reserved for commercial vehicles and often include specific lanes for different vehicle types (e.g., taxis lanes, bus lanes).

SUMMARY

Various examples are now described to introduce a selection of concepts in a simplified form that are further described below in the Detailed Description. The Summary is not intended to be used to limit the scope of the claimed subject matter.

In sample embodiments, a traffic queue is provided that includes a plurality of ground-side wireless charging assemblies installed in the ground in at least one charging lane and spaced to permit at least two vehicles to be simultaneously charged by wireless power transfer in a charging lane, and a signaling system that facilitates automatic wireless charging of a vehicle as the vehicle moves from a first ground-side wireless charging assembly to a second ground-side wireless charging assembly in the at least one charging lane. The signaling system provides a time-ordered sequence of messaging between the first and second ground-side wireless charging assemblies and a vehicle-side wireless charging assembly mounted on the vehicle whereby the vehicle is charged at the first and second ground-side wireless charging assemblies as the vehicle advances in the at least one charging lane.

In other sample embodiments, the signaling system manages a setup phase, a charging phase, and a finish phase for one or more ground-side wireless charging assemblies in the at least one charging lane. At least one server associated with charging of the electric vehicle may also be provided. The signaling system establishes communication with the vehicle and the at least one server during the setup phase. An authorization phase may also be provided that includes an exchange of electric vehicle information with the at least one server to authorize the vehicle for charging. The at least one server may provide voltage and current information or power limit information to the ground-side wireless charging assembly that is appropriate for charging the vehicle authorized for charging.

In further sample embodiments, the charging phase includes wirelessly transferring charge from the ground-side wireless charging assembly to the vehicle-side wireless charging assembly of the authorized vehicle until at least one of: a battery of the vehicle is fully charged, the vehicle-side wireless charging assembly signals the ground-side wireless charging assembly to stop charging, or the vehicle drives off the ground-side wireless charging assembly. The ground-side wireless charging assembly may detect that the vehicle has driven off the ground-side wireless charging assembly by detecting a change in alignment with the vehicle from a change in a charging signal, by receiving a signal from the vehicle-side wireless charging assembly indicating that the vehicle has driven off the ground-side wireless charging assembly, by detecting a change in current in a primary coil of the ground-side wireless charging assembly, or by detecting a loss of communications between the ground-side wireless charging assembly and the vehicle-side wireless charging assembly.

In still further embodiments, a database associated with the at least one server is provided. In such embodiments, the finish phase may include the signaling system transmitting billing related information for the charging, terminating charge authorization for the vehicle, and updating the database with data and statistical performance information associated with the charging of the vehicle. Once the first ground-side wireless charging assembly is authorized to charge the vehicle and starts a first charging session, the at least one server may maintain authorization permission for the vehicle until the vehicle exits the at least one charging lane or until expiration of a timeout period. Once the vehicle progresses in the at least one charging lane to the second ground-side wireless charging assembly, is authorized to charge the vehicle, and starts a second charging session, the at least one server may use the maintained authorization permission. The authorization may be maintained at least until completion of a final charging session in the at least one charging lane. When the final charging session in the at least one charging lane has been completed, the at least one server may complete a charging transaction using aggregated charging data from each authorized charging session in the at least one charging lane.

In sample configurations of the traffic queue, the signaling system may include at least one charging station server located in a charging station including the plurality of ground-side wireless charging assemblies and at least one server external to the charging station. The at least one charging station server may be adapted to manage electrical supply to the plurality of ground-side wireless charging assemblies and to manage interconnection to the at least one server external to the charging station. An external database may also be provided that is associated with the at least one server external to the charging station. The external database may store vehicle charging data and authorization data for a plurality of vehicles. The charging station may also comprise at least one power supply. The at least one charging station server may receive status and alarms from the at least one power supply and may send initiate, charge level, and terminate commands to the at least one power supply during a charging session.

In other sample configurations of the traffic queue, the at least one charging lane may comprise a first lane configured to charge passenger vehicles and a second lane configured to charge passenger buses or cargo vehicles.

In yet other sample configurations of the traffic queue, the signaling system may communicate with the vehicle prior to alignment in the at least one charging lane to direct the vehicle to a particular charging lane of the at least one charging lane based on a charging state of the vehicle. Also, the at least one charging lane may comprise a road surface inscribed with markers to assist with lane selection for the vehicle and alignment of the vehicle with the ground-side wireless charging assemblies. The markers may include lines, symbols, lights, and/or bollards.

Methods are also described herein for charging electric vehicles. In accordance with such methods, an electric vehicle is charged in a traffic queue having at least one charging lane comprising a plurality of ground-side wireless charging assemblies installed in the ground in the at least one charging lane and spaced to permit at least two vehicles to be simultaneously charged by wireless power transfer in a charging lane. The method includes: aligning the vehicle with a first ground-side wireless charging assembly in the at least one charging lane; charging the vehicle using the first ground-side wireless charging assembly in the at least one charging lane in a first charging session; advancing the vehicle to a second ground-side wireless charging assembly in the at least one charging lane; aligning the vehicle with the second ground-side wireless charging assembly in the at least one charging lane; charging the vehicle using the second ground-side wireless charging assembly in the at least one charging lane in a second charging session; and providing a time-ordered sequence of messaging between the first and second ground-side wireless charging assemblies and a vehicle-side wireless charging assembly mounted on the vehicle to control the first and second charging sessions.

The methods may further include providing the time-ordered sequence of messaging using a signaling system that sends signals to manage a setup phase, a charging phase, and a finish phase for the first and second ground-side wireless charging assemblies in the at least one charging lane. The signaling system may establish communication with the vehicle and at least one server associated with charging of the electric vehicle in the setup phase. Electric vehicle information may be exchanged with the at least one server to authorize the vehicle for charging during an authorization phase. The at least one server may further provide voltage and current information or power limit information to at least one of the first and second ground-side wireless charging assemblies upon authorization for charging the vehicle.

The methods may further include wirelessly transferring charge from at least one of the first or second ground-side wireless charging assemblies to the vehicle-side wireless charging assembly of the authorized vehicle during the charging phase until at least one of: a battery of the vehicle is fully charged, the vehicle-side wireless charging assembly signals the at least one of the first or second ground-side wireless charging assemblies to stop charging, or the vehicle drives off the at least one first or second ground-side wireless charging assembly. The at least one first or second ground-side wireless charging assembly may detect that the vehicle has driven off the at least one first or second ground-side wireless charging assembly by detecting a change in alignment with the vehicle from a change in a charging signal, by receiving a signal from the vehicle-side wireless charging assembly indicating that the vehicle has driven off the at least one first or second ground-side wireless charging assembly, by detecting a change in current in a primary coil of the ground-side wireless charging assembly, or by detecting a loss of communications between the ground-side wireless charging assembly and the vehicle-side wireless charging assembly.

During the finish phase, the signaling system may transmit billing related information for the charging, terminating the charge authorization for the vehicle and update a database with data and statistical performance information associated with the charging of the vehicle. Once the first ground-side wireless charging assembly is authorized to charge the vehicle and starts the first charging session, the at least one server may maintain authorization permission for the vehicle until the vehicle exits the at least one charging lane or until expiration of a timeout period. Once the vehicle progresses in the at least one charging lane to the second ground-side wireless charging assembly, is authorized to charge the vehicle, and starts the second charging session, the at least one server may use the maintained authorization permission and maintain the authorization at least until completion of a final charging session in the at least one charging lane. Once the final charging session in the at least one charging lane has been completed, the at least one server may complete a charging transaction using aggregated charging data from each authorized charging session in the at least one charging lane.

The methods may further include at least one charging station server located in a charging station including the plurality of ground-side wireless charging assemblies managing electrical supply to the plurality of ground-side wireless charging assemblies and managing interconnection to at least one server external to the charging station. Vehicle charging data and authorization data for a plurality of vehicles also may be stored in an external database associated with the at least one server external to the charging station. The charging station may comprise at least one power supply, and the at least one charging station server may receive status and alarms from the at least one power supply. The at least one charging station server also may send initiate, charge level, and terminate commands to the at least one power supply during a charging session.

The methods may also include charging passenger vehicles in a first charging lane of the at least one charging lane and charging passenger buses or cargo vehicles in a second charging lane of the at least one charging lane. The signaling system may communicate with the vehicle prior to alignment in the at least one charging lane to direct the vehicle to a particular one of the at least one charging lane based on a charging state of the vehicle. The vehicle may also be guided to at least one of the first or second ground-side wireless charging assemblies using markers inscribed in a road surface of the at least one charging lane to assist with lane selection for the vehicle and alignment with the at least one of the first or second ground-side wireless charging assemblies.

This summary section is provided to introduce aspects of the inventive subject matter in a simplified form, with further explanation of the inventive subject matter following in the text of the detailed description. The particular combination and order of elements listed in this summary section is not intended to provide limitation to the elements of the claimed subject matter. Rather, it will be understood that this section provides summarized examples of some of the embodiments described in the Detailed Description below.

BRIEF DESCRIPTION OF THE DRAWINGS

The foregoing and other beneficial features and advantages of the invention will become apparent from the following detailed description in connection with the attached figures, of which.

DETAILED DESCRIPTION

Embodiments of the traffic queue with automatic wireless charging described herein may be understood more readily by reference to the following detailed description taken in connection with the accompanying figures and examples that form a part of this disclosure. It is to be understood that this description is not limited to the specific products, methods, conditions, or parameters described and/or shown herein, and that the terminology used herein is for the purpose of describing particular embodiments by way of example only and is not intended to be limiting of any claimed subject matter. Similarly, any description as to a possible mechanism or mode of action or reason for improvement is meant to be illustrative only, and the subject matter described herein is not to be constrained by the correctness or incorrectness of any such suggested mechanism or mode of action or reason for improvement. Throughout this text, it is recognized that the descriptions refer both to methods and systems/software for implementing such methods.

A detailed description of illustrative embodiments will now be described with reference to FIGS. 1-7. Although this description provides a detailed description of possible implementations, it should be noted that these details are intended to be exemplary and in no way delimit the scope of the inventive subject matter. Note that the term "battery" is used herein to depict a generic chemical energy storage system and could be replaced, supplemented, or hybridized with other portable energy storage systems (e.g., solid-state batteries, reversable fuel cells, ultra-capacitors, etc.). Also, while many of the examples used are of a wireless power transfer (WPT) system used to power the onboard systems and charge the batteries of a stationary electric vehicle (EV), this use is by no means the only use contemplated.

Taxis cab queues assemble commercial passenger vehicles into ordered rows. In one embodiment, both the taxi line and the passenger line operate on a first-come, first-served queue, so that the first-in-queue taxi picks-up the first-in-line passenger (and luggage) to arrive. In this embodiment, most taxis are idle while in the queue, with intermittent movement as the queue proceeds. Electrically powered taxis may be preferred due to the lack of emissions when idling, especially in high-traffic, roofed (or semi-enclosed) pick-up/drop-off locations.

Figure 1:
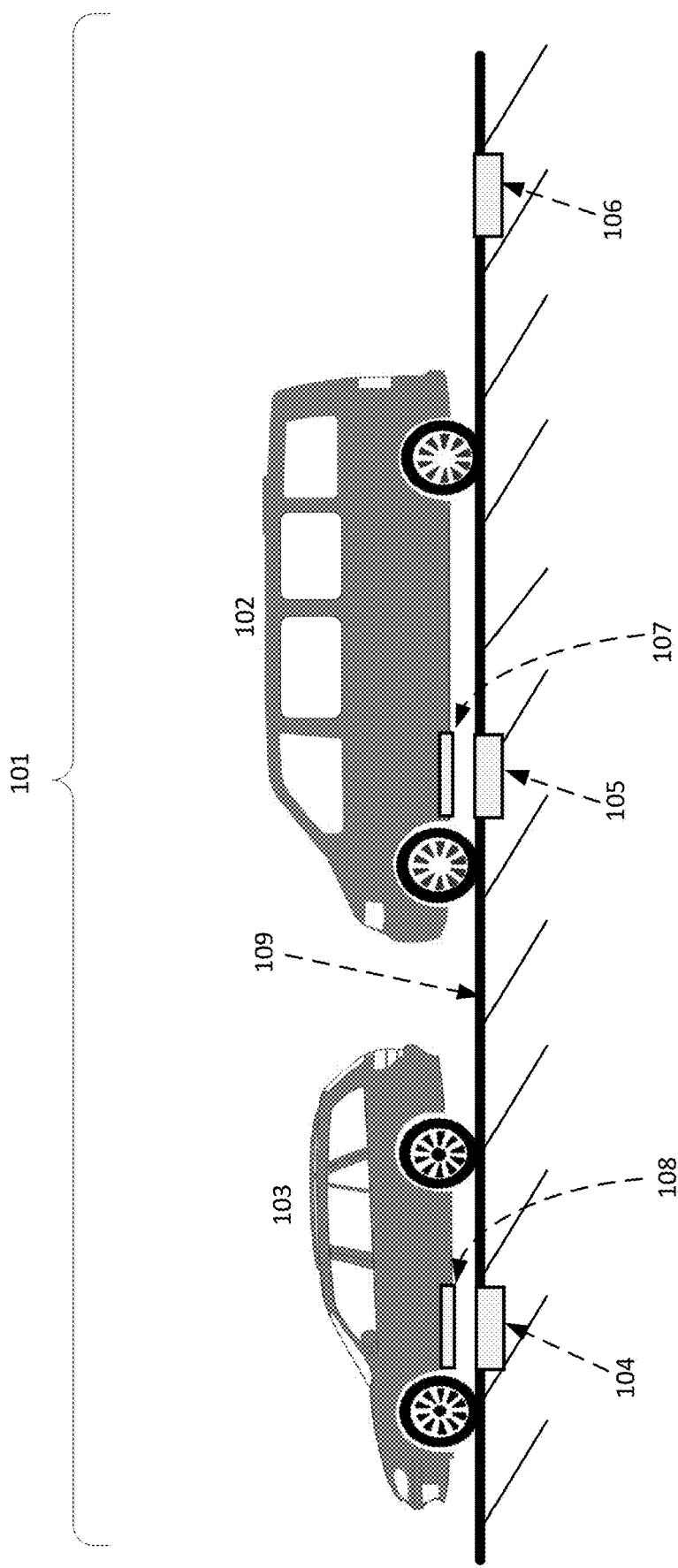
FIG. 1 illustrates an example traffic queue with automatic wireless charging using installed ground charging assemblies.

FIG. 1 illustrates an example traffic queue 101, where electric vehicles 102 and 103 are idle, waiting for passengers or freight. Wireless Power Transfer (WPT), also known as Inductive Power Transfer, allows for charging of the vehicle batteries from ground-side primary assemblies 104, 105, and 106 through the magnetic excitation of vehicle mounted secondary assemblies 107 and 108 of the respective vehicles 102 and 103. The ground-side primary assemblies are located such that two or more vehicles in the same queue may be simultaneously charged using the respective ground-side primary assemblies 104, 105, and 106. A battery of the vehicle assemblies 107 and 108 may include an array of chemical cells, capacitive cells (e.g., ultracapacitors), reversable fuel cells or a mixture thereof, creating a hybrid array.

The traffic queue road surface 109 may be inscribed with text and markers to assist drivers (and/or automated driving system(s)) with lane selection and alignment with ground-side primary assemblies 104, 105, and 106. Lines, symbols, and lights also may be installed in the road surface 109 for assistance of automated driving systems.

Figure 2:
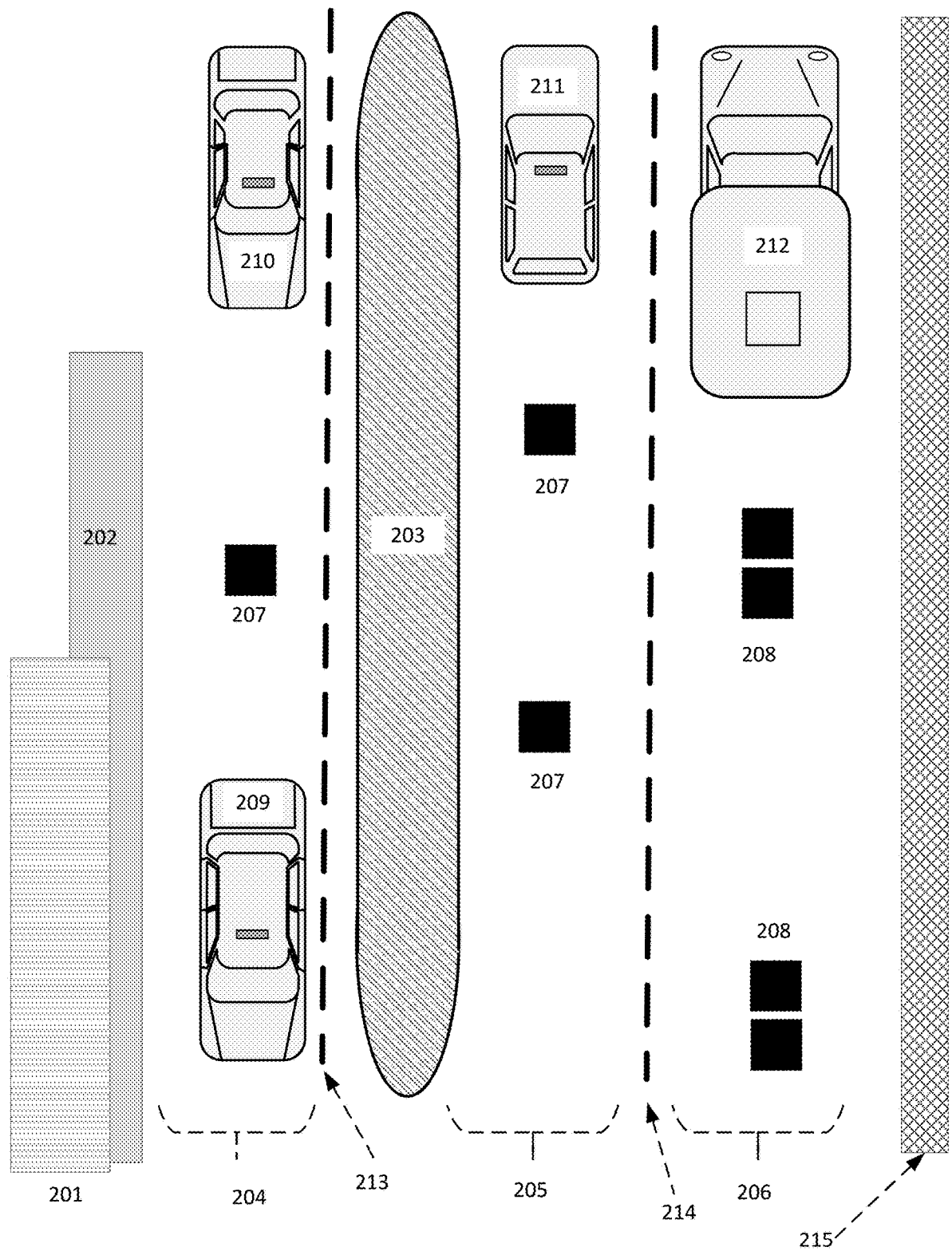
FIG. 2 illustrates a multi-lane traffic stand with multiple queues for automatic wireless charging using installed ground charging assemblies.

FIG. 2 illustrates a multi-lane traffic stand with multiple queues for automatic wireless charging using installed ground charging assemblies at a high-volume transport hub (e.g., an airport). The roofed area 201 provides cover from the elements, and the sidewalk 202 provides pedestrian access to the passenger vehicles. In this example, a raised traffic control embankment 203 is used to extend the automatic charging area of the first charging lane 204, including a single primary assembly equipped charge point 207, to further include second charging lane 205 for charging standard passenger vehicles 209, 210, and 211. A third charging lane 206 is equipped with one or more paired primary assembly charging points 208 allowing automatic charging of larger vehicles 212. As illustrated, the charging points 207 and 208 are spaced apart in the respective charging lanes 204, 205, and 206 to permit multiple vehicles to charge while the vehicles are idle in the respective charging lanes 204, 205, and 206.

Lane markings 213, 214, and 215 (painted, reflective, lighted pavement features or constructed of bollards or posts) are multi-purpose for directing drivers and automated driving systems to the charging points 207 and 208 and for keeping pedestrians away from the charging points 207 and 208.

Figure 3:
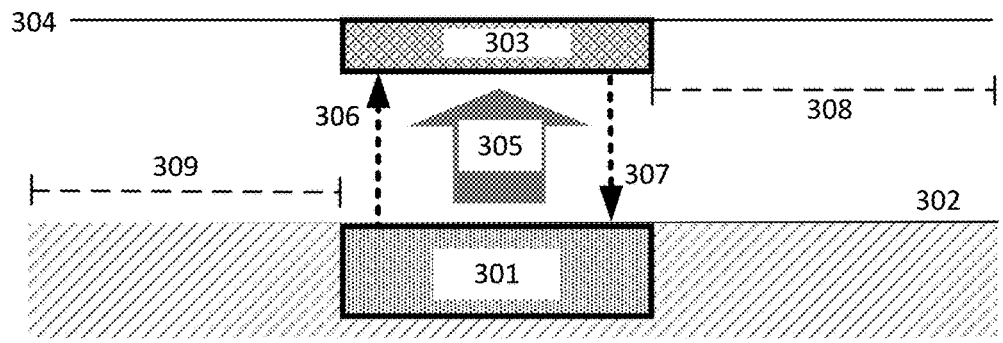
FIG. 3 illustrates the wireless charging signals and ranges used in automatic wireless charging at a single charge point in sample embodiments.

FIG. 3 illustrates the wireless charging signals and ranges used in automatic wireless charging at a single charge point in sample embodiments. For automatic charging, the ground primary assembly 301, shown here as embedded to be flush with the surface of the pavement 302, must be aligned and in communication with the vehicle secondary assembly 303 during charging. In this example, the secondary assembly 303 is mounted on the underside of the vehicle chassis 304.

Before the charging signal 305 can be initiated, an uplink 306 and downlink 307 data path are established as described, for example, in U.S. Pat. No. 10,135,496, incorporated by reference above. The inductive links 306 and 307 are power limited with approach range 308 and departure range 309 barely exceeding the size of the primary ground coil assembly 301 (approximately 500 millimeters). Additional information on the alignment process can be found in U.S. Pat. No. 10,814,729, entitled "Method and apparatus for the alignment of a vehicle and charging coil prior to wireless charging;" U.S. Pat. No. 10,193,400 entitled "Method of and apparatus for detecting coil alignment error in wireless inductive power transmission;" and U.S. Pat. No. 10,040,360 entitled "Method and apparatus for the alignment of vehicles prior to wireless charging including a transmission line that leaks a signal for alignment," the contents of which are incorporated herein by reference. Other embodiments may include alternative short range local area wireless networking technologies (e.g., Bluetooth, Zigbee, Wi-Fi) or longer range Wireless wide area network (WWAN) technologies (e.g., cellular technology such as LTE, Connected Car wireless packet data networking, etc.). In still other embodiments, additional or supplemental communications devices may be used by the driver or automated driving system to query information on the charging location, availability, and pricing.

Figure 4:
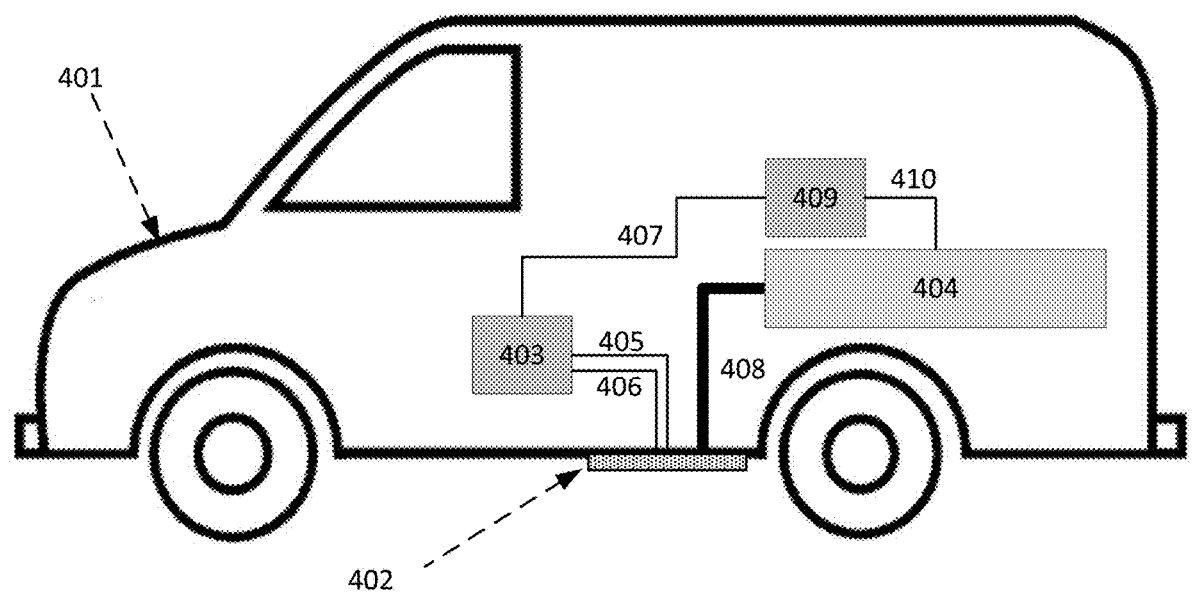
FIG. 4 illustrates, at a high level, the electric vehicle systems involved with automatic wireless charging in sample embodiments.

FIG. 4 illustrates, at a high level, the electric vehicle systems involved with automatic wireless charging in sample embodiments. As illustrated, the electric vehicle 401 is equipped with a secondary vehicle coil assembly 402 (in this case a single coil unit). The Battery Management System (BMS) 409 is responsible for monitoring and management of the battery 404. Based on algorithms, the BMS 409 manages performance and maximizes range and longevity by setting charge rates and balancing individual cell (or cell bank) charging/discharging while monitoring charge levels and temperatures.

The BMS 409 controls the charging session (and associated logistics, billing, and sensor reading) with messaging sent via the downlink datalink 405 and uplink datalink 406 supported by the inductive communications transceiver system provided by the secondary assembly 402. A data store of the BMS 409 includes identity and authorization information, battery voltage, and a maximum current level setting. The wireless charging controller 403 functions to translate and bridge the vehicle network and the inductive communications transceiver system via data link 407, which may be, for example, implemented as a wired or wireless Controller Area Network (CAN) bus. The BMS 409 measures sensor data from the battery 404 via wired (or wireless) connections 410.

The secondary vehicle coil assembly 402 delivers direct current to the battery pack 404 via a high-current bus 408. In cases where the battery pack 404 is fully charged, current also may be diverted or shared with onboard systems of vehicle 401, such as communications, entertainment, and environmental control while in the queue and aligned and in communications with the charge point's primary assembly(s).

Figure 5:
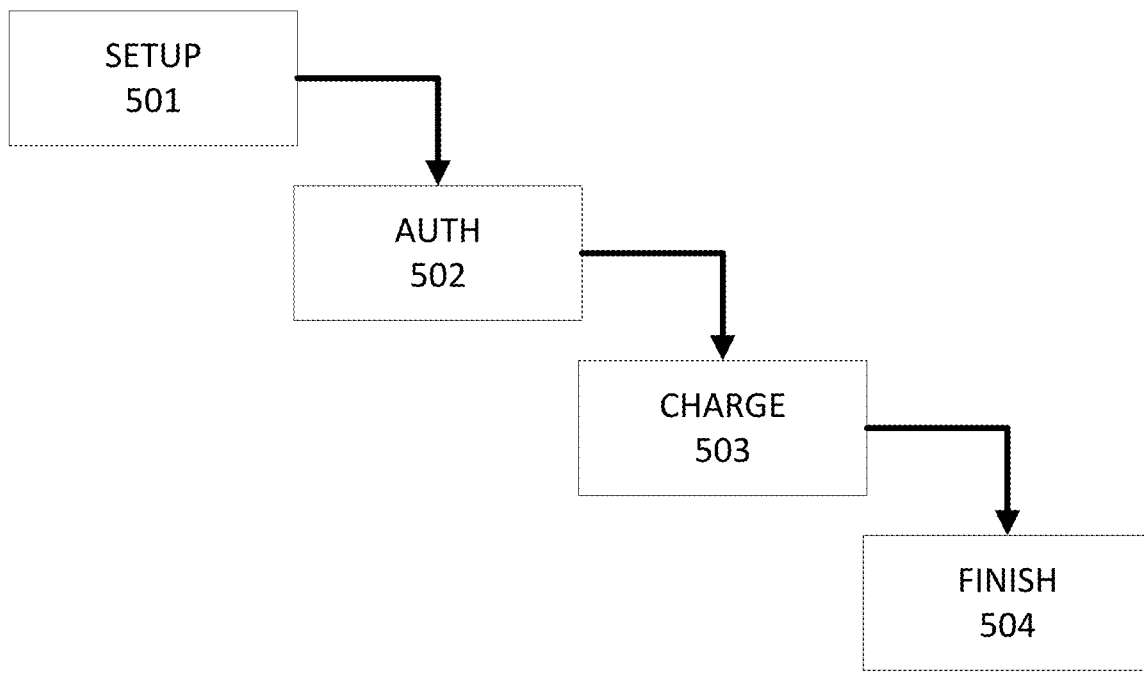
FIG. 5 illustrates an example of inter-system signaling to facilitate automatic wireless charging of an electric vehicle in a queue in sample embodiments.

FIG. 5 illustrates an example of inter-system signaling to facilitate automatic wireless charging of an electric vehicle in a queue in sample embodiments. In particular, FIG. 5 illustrates a time-ordered sequence of messaging between the functional entities involved in automatic charging within a traffic queue.

The Setup phase 501 includes the alignment of the EV and establishment of communication with entities external to the charging station. The entities include all EV related Encryption, Authentication, Authorization, Accounting and Administration servers as well as data repositories associated with EV charging. During the Setup phase 501, the charge point cluster (e.g., 207 or 208 in FIG. 2) broadcasts one or more inductive beacons. This beacon is received by one or more members of a secondary vehicle coil cluster. Once alignment between the primary ground coil assembly and the secondary vehicle coil assembly is attained, the EV's secondary vehicle coil cluster informs the BMS 409 (FIG. 4). An encrypted authentication and authorization operation 502 is needed before charging can begin with at least the vehicle identifier and the charging allowance.

Figure 7:
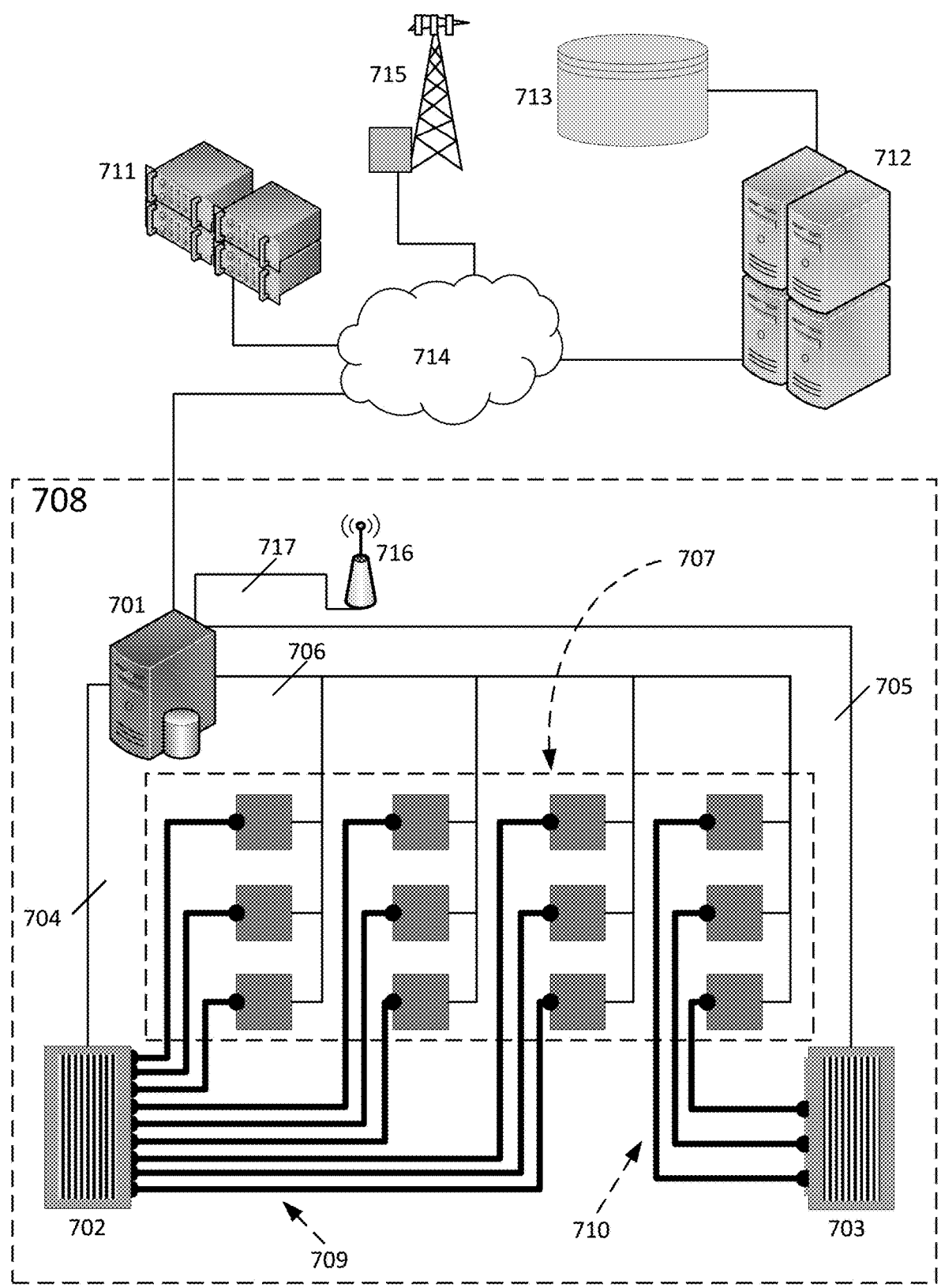
FIG. 7 illustrates a control system for multiple ground charging assemblies in a sample embodiment.

The authentication and authorization (Auth) phase 502 includes the exchange of messaging with the external authorization servers (see FIG. 7). Successful authorization to charge (and to thus to bill) depends on the exchange of EV information (in this example, stored in the BMS 409) with an external authorization server over a secure link. One example of the protocol to access external servers and data repositories that may be used in this embodiment is the draft ISO/DIS 15118-20 standard, "Vehicle-to-grid communication interface-Part 20: 2nd generation network and application protocol requirements."

The ISO 15118 standard includes an automated method for billing authorization that combines the authorization phase into the setup phase messaging. Called "Plug & Charge" in earlier 15118 editions, this method enables a cryptographic security mechanism on the transport layer (Transport Layer Security (TLS)) and on the application layer (using digital XML-based signatures and digital certificates) which allows the setup messaging to include an implicit authentication and authorization. In an embodiment implementing the ISO 15118 standard, a separate authorization phase may not be necessary.

Once the Auth phase 502 is complete, the charge point (CP), also known as the ground-side coil assembly (GA), is energized to the required voltage and current. In this example, the GA is a cluster of one or more primary ground coil assemblies that transmit energy and provide duplex communications transceiver functions with the corresponding secondary vehicle coil assembly cluster. The secondary vehicle coil assembly, also known as the vehicle assembly (VA), is a vehicle-mounted cluster of one or more secondary vehicle coil assembly(s) that receive energy and provide the duplex communications transceiver functions with the corresponding primary assembly cluster. During charging, the VA receives power to charge the battery system and to provide power to EV battery systems.

The Charge phase 503 lasts until the battery pack 404 is fully charged, the BMS 409 signals to stop charging, or the vehicle drives off the charge point (e.g., 207 or 208 in FIG. 2). Drive off detection provided on the vehicle side can include detection that 1) the gear has shifted from park, 2) the gear has shifted from park and the brake indication switches from on-to-off, 3) an accelerometer senses movement above a threshold, 4) BMS 409 signals to stop charging, and/or 5) the driver or drive system signals to stop charging. Drive off detection on the ground side can include detection that the GA detects a change in alignment via the charging signal change (e.g., primary coil current increase), the GA detects a change in alignment via the duplex inductive communications system, or degradation of inductive communications in bit error rate up to loss of signal.

At completion of the Charge phase 503, the Finish stage 504 is initiated. During the Finish stage 504, billing related information is transmitted, authorization to charge is terminated, and local and external databases are updated with data and statistical performance information and then finally encrypted data links are shut down. Billing related information may include electrical energy delivered, vehicle or location rating information, charging lane rate, per charge point (per charging session) time, per charge point (per charging session) power delivered, total aggregate charging time, total aggregate charging time, and/or flat-rate charge cost. Performance information may include temperature readings, charge time (per session), total aggregate charging time, charge levels, voltage, current, and/or power per session or aggregate over multiple contiguous sessions and charge points.

Figure 6:
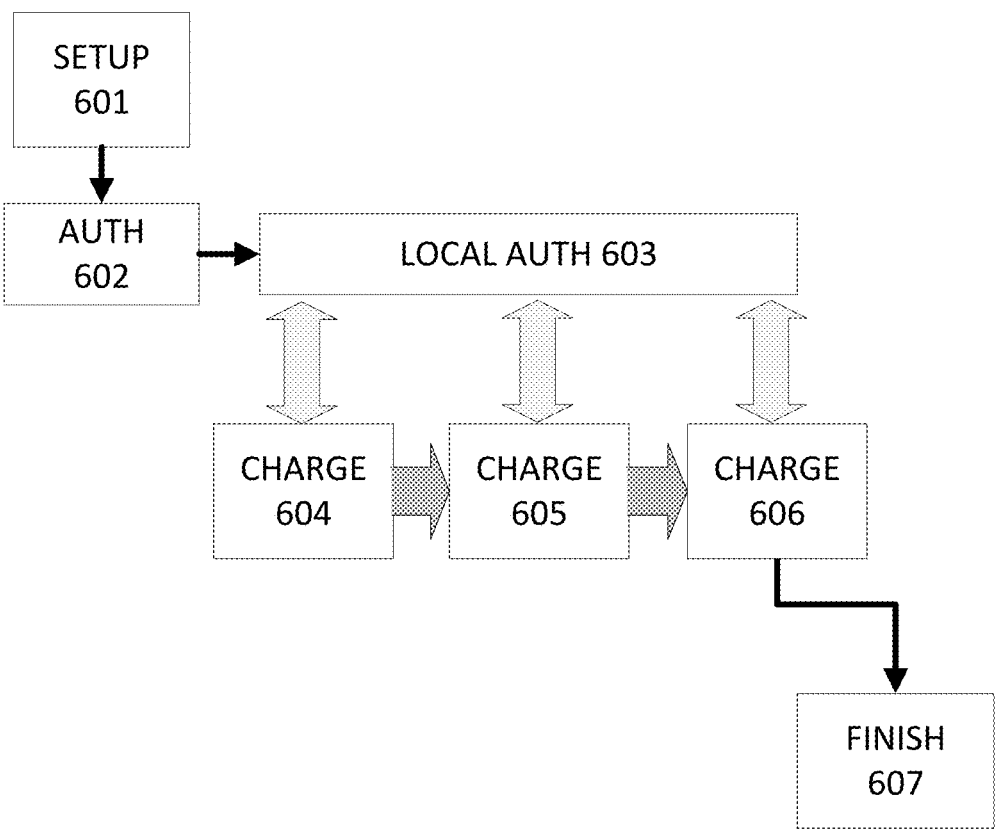
FIG. 6 illustrates an example of inter-system signaling to facilitate automatic wireless charging where the vehicle charging assembly is pre-authorized for billing.

FIG. 6 illustrates an example of inter-system signaling to facilitate automatic wireless charging where the vehicle assembly is pre-authorized for billing. In particular, FIG. 6 illustrates a method for messaging related to authorization and billing of EVs using automatic contactless wireless charging.

Use of independent charge points for traffic queue charging, as described with respect to FIG. 5, includes the aggregation of charging sessions with the same setup messaging required for each charging session in the traffic queue. The independent charge point arrangement has value in reduction of complexity and in that electric vehicles can enter and leave the queue at any charge point and skip a charge point if the queue is emptying quickly.

It will be appreciated that, except in cases of free electric charging to all comers, authorization to charge is required to enable billing. In FIG. 6, coordination of caching on the "edge" or "local" authorization device can be maintained between charging sessions.

As in FIG. 5, the Setup phase 601 in the embodiment of FIG. 6 includes the alignment of the EV and establishment of communication with entities external to the charging station. The Auth phase 602 includes the exchange of messaging with the external authorization servers; however, with 2-to-N wireless charge points in a queue, once the first wireless charge point completes the authorization to charge and starts the first charging session 604, the local or edge authorization server 603 holds the authorization permission in cache until the EV exits the charging area or until timeout. Alternatively, as noted above, an automated method for billing authorization may be used that combines the authorization phase into the setup phase messaging. As the EV progresses in the queue to a second charging point in the same or a different lane and a second charging session 605 is initiated, the cached authorization is used, allowing for a reduction in messaging and setup time for each subsequent charging session. In this example, the authorization persists until completion of the final charging session 606, whereupon the local authorization server 603 completes the transaction using the aggregated charging data from each session that has been authorized. This would remove the extra call to the local authorization server 603 for each pad in the queue. Once the final charging session 606 is complete, the Finish stage 607 is initiated. During the Finish stage 607, billing related information (e.g., the aggregated charging information) is transmitted, authorization to charge is terminated, and local and external databases are updated with data and statistical performance information, and finally encrypted data links are shut down.

FIG. 7 illustrates a control system for multiple ground charging assemblies of a traffic queue charging station with contactless automatic wireless charging in sample embodiments.

The charging station server 701 in this example contains the software to manage the electrical supplies 702 and 703, the internal communication links 704, 705, and 706, the wireless charging points 707, and interconnection to entities (servers, data repositories) external to the charging station 708.

The database server 712 is external to the charging station 708 and serves one or more charging stations 708 over a service area (e.g., geographic, national, continental, worldwide). Vehicle data and authorization-to-bill data is stored in a database 713 accessible by the database server 712. This database server many optionally house a geographic information system (GIS) and services exchange (e.g., a reservation system that allows access to current status and schedule for each charge station and charging lane with coordination of arrival time, charging planning, charging session scheduling, and tracking of loading/unloading rates or other services while maintaining privacy across fleet providers by anonymization and abstraction) enabling access to charger location and services as well as supporting a charger reservation system. A digital data network 714 allows access to the database server 712 either from the charging station server 701 or an optional intermediate server 711.

Each charging point in the queue structure 707 within the charging station 708 is supplied power from the first power supply 702 or the second power supply 703. The first power supply 702 uses a digital datalink 704 to communicate status and alarms to the charging station server 701. The second power supply 703 similarly uses a digital datalink 705 to communicate status and alarms to the charging station server 701. The charging station server 701 sends initiate, charge level, and terminate commands to the first 702 and second 703 power supplies using their respective datalinks 704 and 705 during a charging session.

Reservation or information sessions between the EV driving system (or EV driver using a wireless data device) are enabled thru Wide Area Wireless Access Networks (e.g., Cellular radio) shown here as a base station 715 connected, via the landside packet network 714, to either a remote services exchange 712 or the local services server 701. The local services exchange server 701 may optionally support local Wireless Location Access Network technology (e.g., an IEEE 802.11 Wi-Fi access point 716) connected via datalink 717 to the local server 701.

Additional Embodiments

When taxi vehicles are charging in a "series queue" (a WPT lane or set of WPT lanes) WPT charging may lead to power grid fluctuations as the queued vehicles move forward in line. These fluctuations can occur both at the start of a charging session and at the end of the charging session.

These fluctuations from servicing the charging vehicles are not expected to be problematic short queues, but is expected to worsen the larger the queue gets (both in number of parallel lanes and in charger equipped lane length). The power demand fluctuation issue may happen at large depot-level charging stations as well as WPT loading docks and other large, concentrated WPT deployments.

In one embodiment, a battery-backed localized grid storage system (not shown) to balance/level impact seen from grid. The storage solution can be chemical battery, solid-state battery, or capacitive based. By isolating the charging station 708 to a microgrid, the storage system serves to buffer the local demand from the larger utility grid.

In a second embodiment, under control of the local server 701, the charging points 707 start-of-charging time (post alignment) and ramp-up rates can be adjusted to prevent overly large, undesirable power demand fluctuations.

In another embodiment, deployment of the charging points 707 into the queue can be geometrically distributed to limit the number of charger points engaged in active charging. Potential geometries include smaller spacing (e.g. ½ average vehicle length) or larger spacing (e.g. 1.5 times the average vehicle length). This geometrical distribution of charge points can be varied on a lane-by-lane basis or even within the same lane to limit the number of vehicles simultaneously entering, charging, or moving between charge points 707 in the charging station 708.

In another embodiment, a parallel queue of charge points may have an isolated power supply 703, limiting power fluctuations.

Alternative embodiments (that may be also be used in combination) also include use of illuminated lane signaling devices (e.g. traffic lights) or radio communications (between the local server 701 and the EV-based the driver or driving system) either over the inductive comms system, over short-range WLAN access point(s) 716 or over wide-area radio communications systems base station(s) 715 to coordinate movement of EVs to and between charging points 707. The described embodiments for power fluctuations control can be performed individually or with any or all embodiments used in the same charging station 708 deployment for power fluctuation control.

In another embodiment, passenger buses may also form queues. Using an airport as a common example, passengers are distributed amongst the various entrances and exits from the airline gates and baggage retrieval. Commonly held in depots, awaiting a surge in passenger demand, the shuttle buses may spend considerable time idle both waiting at the passenger pick-up and drop-off point(s), but also waiting in the depot for dispatch.

In yet another embodiment, cargo vehicles may also form queues awaiting a turn at the passenger disembarkment point, dump site or at the loading dock.

In still another embodiment, pre-charging communication between the EV and the charging station would allow for intelligent management of multiple traffic queues. Vehicles with lower battery charge state could be directed to slower charging lanes (which could also be equipped with additional charging points).

CONCLUSION

While various implementations have been described above, it should be understood that they have been presented by way of example only, and not limitation. For example, any of the elements associated with the systems and methods described above may employ any of the desired functionality set forth hereinabove. Thus, the breadth and scope of a preferred implementation should not be limited by any of the above-described sample implementations.

As discussed herein, the logic, commands, or instructions that implement aspects of the methods described herein may be provided in a computing system including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described herein, or other aspects depicted in the accompanying drawings and detailed description below. Such systems and computer-readable media including instructions for implementing the methods described herein also constitute sample embodiments.

The charging functions described herein with respect to FIGS. 4-7 may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass a tangible hardware and/or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Those skilled in the art will appreciate that while the disclosure contained herein pertains to the provision of electrical power to vehicles, it should be understood that this is only one of many possible applications, and other embodiments including non-vehicular applications are possible. For example, those skilled in the art will appreciate that there are numerous applications where customers wait in queues and it is desired to provide charging to customer electronic devices as the customer moves through the queue. For example, inductive portable consumer electronic device chargers, such as those (e.g., PowerMat™) used to charge toothbrushes, cellular telephones, and other devices may be managed as described herein. Accordingly, these and other such applications are included within the scope of the following claims.

What is claimed:

1. A traffic queue comprising:
   at least one charging lane comprising a plurality of ground-side wireless charging assemblies installed in the ground in the at least one charging lane and spaced to permit at least two electric vehicles to be simultaneously charged by wireless power transfer, and a charging authorization server, wherein charging each electric vehicle comprises aligning the electric vehicle with a first ground-side wireless charging assembly in the at least one charging lane, charging the electric vehicle using the first ground-side wireless charging assembly in the at least one charging lane in a first charging session, advancing the electric vehicle to a second ground-side wireless charging assembly in the at least one charging lane, aligning the electric vehicle with the second ground-side wireless charging assembly in the at least one charging lane, and charging the electric vehicle using the second ground-side wireless charging assembly in the at least one charging lane in a second charging session; and
   a signaling system that facilitates automatic wireless charging of an electric vehicle as the electric vehicle moves from the first ground-side wireless charging assembly to the second ground-side wireless charging assembly in the at least one charging lane by providing a time-ordered sequence of messaging between the first and second ground-side wireless charging assemblies and a vehicle-side wireless charging assembly mounted on the electric vehicle to control alignment, authorization, and charging by the first and second ground-side wireless charging assemblies, the time-ordered sequence of messaging including an inductive beacon broadcast from at least one of the first or second ground-side charging assemblies to the vehicle-side wireless charging assembly of the electric vehicle for use in aligning, authorizing charging, and charging the electric vehicle with the first and second ground-side charging assemblies, and an authorization message broadcast to the charging authorization server for billing authorization, whereby, upon billing authorization, the at least one of the first or second ground-side charging assemblies initiates charging of the electric vehicle as the electric vehicle advances in the at least one charging lane.

2. The traffic queue of claim 1, wherein the signaling system manages a setup phase, a charging phase, and a finish phase for the at least one ground-side wireless charging assembly in the at least one charging lane.

3. The traffic queue of claim 2, wherein the setup phase includes the signaling system establishing communication with the electric vehicle and the charging authorization server.

4. The traffic queue of claim 3, wherein the signaling system further manages an authorization phase including an exchange of electric vehicle information with the charging authorization server to authorize the electric vehicle for charging.

5. The traffic queue of claim 4, wherein the charging authorization server provides voltage and current information or power limit information to the ground-side wireless charging assembly that is appropriate for charging the electric vehicle authorized for charging.

6. The traffic queue of claim 5, wherein the charging phase includes wirelessly transferring charge from the ground-side wireless charging assembly to the vehicle-side wireless charging assembly of the authorized electric vehicle until at least one of: a battery of the electric vehicle is fully charged, the vehicle-side wireless charging assembly signals the ground-side wireless charging assembly to stop charging, or the electric vehicle drives off the ground-side wireless charging assembly.

7. The traffic queue of claim 6, wherein the ground-side wireless charging assembly detects that the electric vehicle has driven off the ground-side wireless charging assembly by detecting a change in alignment with the electric vehicle from a change in a charging signal, by receiving a signal from the vehicle-side wireless charging assembly indicating that the electric vehicle has driven off the ground-side wireless charging assembly, by detecting a change in current in a primary coil of the ground-side wireless charging assembly, or by detecting a loss of communications between the ground-side wireless charging assembly and the vehicle-side wireless charging assembly.

8. The traffic queue of claim 3, further comprising a database associated with the charging authorization server, wherein the finish phase includes the signaling system transmitting billing related information for the charging, terminating charge authorization for the electric vehicle, and updating the database with data and statistical performance information associated with the charging of the electric vehicle.

9. The traffic queue of claim 3, wherein once the first ground-side wireless charging assembly is authorized to charge the electric vehicle and starts a first charging session, the charging authorization server maintains authorization permission for the electric vehicle until the electric vehicle exits the at least one charging lane or until expiration of a timeout period.

10. The traffic queue of claim 9, wherein once the electric vehicle progresses in the at least one charging lane to the second ground-side wireless charging assembly, is authorized to be charged, and a second charging session is started, the charging authorization server uses the maintained authorization permission, and the authorization permission is maintained at least until completion of a final charging session in the at least one charging lane.

11. The traffic queue of claim 10, wherein when the final charging session in the at least one charging lane has been completed, the charging authorization server completes a charging transaction using aggregated charging data from each authorized charging session in the at least one charging lane.

12. The traffic queue of claim 1, wherein the plurality of ground-side wireless charging assemblies and charging authorization server are located at a charging station, the charging authorization server managing electrical supply to the plurality of ground-side wireless charging assemblies and managing interconnection to a server external to the charging station.

13. The traffic queue of claim 12, further comprising an external database associated with the server external to the charging station, the external database storing electric vehicle charging data and authorization data for a plurality of electric vehicles.

14. The traffic queue of claim 12, wherein the charging station comprises at least one power supply and the charging authorization server receives status and alarms from the at least one power supply and sends initiate, monitor charge level, and terminate commands to the at least one power supply during a charging session.

15. The traffic queue of claim 1, wherein the at least one charging lane comprises a first lane configured to charge passenger vehicles and a second lane configured to charge passenger buses or cargo vehicles.

16. The traffic queue of claim 1, wherein the signaling system communicates with the electric vehicle prior to alignment in the at least one charging lane to direct the electric vehicle to a particular charging lane of the at least one charging lane based on a charging state of the electric vehicle.

17. The traffic queue of claim 1, wherein the at least one charging lane comprises a road surface inscribed with markers to assist with lane selection for the electric vehicle and alignment of the electric vehicle with the ground-side wireless charging assemblies.

18. The traffic queue of claim 17, wherein the markers include at least one of lines, symbols, lights, or bollards.

19. A method of charging an electric vehicle in a traffic queue having at least one charging lane comprising a plurality of ground-side wireless charging assemblies installed in the ground in the at least one charging lane and spaced to permit at least two electric vehicles to be simultaneously charged by wireless power transfer in a charging lane, comprising:
   aligning the electric vehicle with a first ground-side wireless charging assembly in the at least one charging lane;
   charging the electric vehicle using the first ground-side wireless charging assembly in the at least one charging lane in a first charging session;
   advancing the electric vehicle to a second ground-side wireless charging assembly in the at least one charging lane;
   aligning the electric vehicle with the second ground-side wireless charging assembly in the at least one charging lane;
   charging the electric vehicle using the second ground-side wireless charging assembly in the at least one charging lane in a second charging session; and
   providing a time-ordered sequence of messaging between the first and second ground-side wireless charging assemblies and a vehicle-side wireless charging assembly mounted on the electric vehicle to control alignment, authorization, and charging by the first and second ground-side wireless charging assemblies during the first and second charging sessions the time-ordered sequence of messaging including an inductive beacon broadcast from at least one of the first or second ground-side charging assemblies to the vehicle-side wireless charging assembly of the electric vehicle for use in aligning, authorizing charging, and charging the electric vehicle with the first and second ground-side charging assemblies, and an authorization message broadcast to a charging authorization server for billing authorization, whereby, upon billing authorization, the at least one of the first or second ground-side charging assemblies initiates charging of the electric vehicle as the electric vehicle advances in the at least one charging lane.

20. The method of claim 19, wherein providing the time-ordered sequence of messaging comprises a signaling system sending signals to manage a setup phase, a charging phase, and a finish phase for the first and second ground-side wireless charging assemblies in the at least one charging lane.

21. The method of claim 20, further comprising the signaling system establishing communication with the electric vehicle and the charging authorization server in the setup phase.

22. The method of claim 21, further comprising the signaling system managing an authorization phase including exchanging electric vehicle information with the charging authorization server to authorize the electric vehicle for charging.

23. The method of claim 22, further comprising the charging authorization server providing voltage and current information or power limit information to at least one of the first or second ground-side wireless charging assemblies upon authorization for charging the electric vehicle.

24. The method of claim 23, wherein the charging phase includes wirelessly transferring charge from at least one of the first or second ground-side wireless charging assemblies to the vehicle-side wireless charging assembly of the authorized electric vehicle until at least one of: a battery of the electric vehicle is fully charged, the vehicle-side wireless charging assembly signals the at least one of the first or second ground-side wireless charging assemblies to stop charging, or the electric vehicle drives off the at least one first or second ground-side wireless charging assembly.

25. The method of claim 24, further comprising the at least one first or second ground-side wireless charging assembly detecting that the electric vehicle has driven off the at least one first or second ground-side wireless charging assembly by detecting a change in alignment with the electric vehicle from a change in a charging signal, by receiving a signal from the vehicle-side wireless charging assembly indicating that the electric vehicle has driven off the at least one first or second ground-side wireless charging assembly, by detecting a change in current in a primary coil of the ground-side wireless charging assembly, or by detecting a loss of communications between the ground-side wireless charging assembly and the vehicle-side wireless charging assembly.

26. The method of claim 21, wherein the finish phase includes the signaling system transmitting billing related information for the charging, terminating the charge authorization for the electric vehicle, and updating a database with data and statistical performance information associated with the charging of the electric vehicle.

27. The method of claim 21, further comprising, once the first ground-side wireless charging assembly is authorized to charge the electric vehicle and starts the first charging session, the charging authorization server maintaining authorization permission for the electric vehicle until the electric vehicle exits the at least one charging lane or until expiration of a timeout period.

28. The method of claim 27, further comprising, once the electric vehicle progresses in the at least one charging lane to the second ground-side wireless charging assembly, is authorized to be charged, and the second charging session is started, the charging authorization server using the maintained authorization permission and maintaining the authorization at least until completion of a final charging session in the at least one charging lane.

29. The method of claim 28, wherein when the final charging session in the at least one charging lane has been completed, the charging authorization server completing a charging transaction using aggregated charging data from each authorized charging session in the at least one charging lane.

30. The method of claim 19, wherein the plurality of ground-side wireless charging assemblies and charging authorization server are located at a charging station, the charging authorization server managing electrical supply to the plurality of ground-side wireless charging assemblies and managing interconnection to at least one server external to the charging station.

31. The method of claim 30, further comprising storing electric vehicle charging data and authorization data for a plurality of electric vehicles in an external database associated with the at least one server external to the charging station.

32. The method of claim 30, wherein the charging station comprises at least one power supply, the charging authorization server receiving status and alarms from the at least one power supply and sending initiate, monitor charge level, and terminate commands to the at least one power supply during a charging session.

33. The method of claim 19, further comprising charging passenger vehicles in a first charging lane of the at least one charging lane and charging passenger buses or cargo vehicles in a second charging lane of the at least one charging lane.

34. The method of claim 19, further comprising the signaling system communicating with the electric vehicle prior to alignment in the at least one charging lane to direct the electric vehicle to a particular one of the at least one charging lane based on a charging state of the electric vehicle.

35. The method of claim 19, further comprising guiding the electric vehicle to at least one of the first or second ground-side wireless charging assemblies using markers inscribed in a road surface of the at least one charging lane to assist with lane selection for the electric vehicle and alignment with the at least one of the first or second ground-side wireless charging assemblies.

* * * * *